United States Patent
Zhang et al.

(10) Patent No.: US 8,166,632 B1
(45) Date of Patent: May 1, 2012

(54) METHOD FOR PROVIDING A PERPENDICULAR MAGNETIC RECORDING (PMR) TRANSDUCER

(75) Inventors: Jinqiu Zhang, Fremont, CA (US); Liubo Hong, San Jose, CA (US); Yong Shen, Saratoga, CA (US); Donghong Li, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 972 days.

(21) Appl. No.: 12/057,611

(22) Filed: Mar. 28, 2008

(51) Int. Cl.
*G11B 5/127* (2006.01)
*H04R 31/00* (2006.01)

(52) U.S. Cl. .......... 29/603.16; 29/603.11; 29/603.13; 29/603.14; 29/603.15; 29/603.18; 216/22; 216/39; 216/62; 216/65; 216/66; 360/121; 360/122; 360/317; 451/5; 451/41

(58) Field of Classification Search ........... 29/603.11, 29/603.13–603.16, 603.18; 216/22, 39, 41, 216/48, 62, 65, 66; 360/121, 122, 317; 451/4, 451/51

See application file for complete search history.

(56) References Cited

U.S. PATENT DOCUMENTS

| | | |
|---|---|---|
| 4,675,075 A | 6/1987 | Sakai et al. |
| 4,968,382 A | 11/1990 | Jacobson et al. |
| 5,075,956 A | 12/1991 | Das |
| 5,635,423 A | 6/1997 | Huang et al. |
| 5,996,213 A | 12/1999 | Shen et al. |
| 6,024,885 A | 2/2000 | Pendharkar et al. |
| 6,054,384 A | 4/2000 | Wang et al. |
| 6,195,229 B1 | 2/2001 | Shen et al. |
| 6,243,939 B1 | 6/2001 | Chen et al. |
| 6,368,519 B1 | 4/2002 | Katakura et al. |
| 6,423,475 B1 | 7/2002 | Lyons |
| 6,472,107 B1 | 10/2002 | Chan |
| 6,521,335 B1 | 2/2003 | Amin et al. |
| 6,540,928 B1 | 4/2003 | Kobrin et al. |
| 6,680,829 B2 | 1/2004 | Chen et al. |
| 6,824,816 B2 | 11/2004 | Aaltonen et al. |
| 6,857,181 B2 | 2/2005 | Lo et al. |
| 6,862,798 B2 | 3/2005 | Kruger et al. |
| 6,866,987 B2 | 3/2005 | Lee |

(Continued)

FOREIGN PATENT DOCUMENTS

JP 63232335 9/1988

OTHER PUBLICATIONS

Jinqiu Zhang, et al., U.S. Appl. No. 11/960,596, filed Dec. 19, 2007.

*Primary Examiner* — Paul D Kim

(57) ABSTRACT

A method and system for providing a PMR transducer including an intermediate layer. The method and system include providing a hard mask layer on the intermediate layer. The hard mask layer is for a reactive ion etch of the intermediate layer. The method and system also include providing a bottom antireflective coating (BARC) layer on the hard mask layer. The BARC layer is also a masking layer for the hard mask layer. The method and system also include forming a trench in the intermediate layer using at least one reactive ion etch (RIE). The trench has a bottom and a top wider than the bottom. The method and system also include providing a PMR pole. At least a portion of the PMR pole resides in the trench.

17 Claims, 8 Drawing Sheets

U.S. PATENT DOCUMENTS

| | | |
|---|---|---|
| 6,870,712 B2 | 3/2005 | Chen et al. |
| 6,877,213 B2 | 4/2005 | Zolla |
| 6,943,993 B2 | 9/2005 | Chang et al. |
| 6,949,833 B2 | 9/2005 | O'Kane et al. |
| 6,954,332 B1 | 10/2005 | Hong et al. |
| 6,954,340 B2 | 10/2005 | Shukh et al. |
| 6,975,486 B2 | 12/2005 | Chen et al. |
| 6,980,403 B2 | 12/2005 | Hasegawa |
| 7,023,658 B1 | 4/2006 | Knapp et al. |
| 7,024,756 B2 | 4/2006 | Le et al. |
| 7,042,682 B2 | 5/2006 | Hu et al. |
| 7,070,698 B2 | 7/2006 | Le |
| 7,080,698 B2 | 7/2006 | Mercer et al. |
| 7,120,989 B2 | 10/2006 | Yang et al. |
| 7,193,815 B1 | 3/2007 | Stoev et al. |
| 7,203,032 B2 | 4/2007 | Kimura et al. |
| 7,239,478 B1 | 7/2007 | Sin et al. |
| 2001/0022704 A1 | 9/2001 | Hong |
| 2002/0181162 A1 | 12/2002 | Chen et al. |
| 2003/0048584 A1 | 3/2003 | Song et al. |
| 2003/0090834 A1 | 5/2003 | Kamarajugadda et al. |
| 2004/0020778 A1 | 2/2004 | Lin et al. |
| 2004/0223258 A1 | 11/2004 | Giorgis et al. |
| 2005/0024771 A1 | 2/2005 | Le |
| 2005/0024779 A1 | 2/2005 | Le et al. |
| 2005/0185332 A1 | 8/2005 | Hsiao et al. |
| 2005/0225898 A1 | 10/2005 | Huang et al. |
| 2006/0002023 A1 | 1/2006 | Le et al. |
| 2006/0023352 A1 | 2/2006 | Le et al. |
| 2006/0044681 A1 | 3/2006 | Le et al. |
| 2006/0044682 A1 | 3/2006 | Le et al. |
| 2006/0102956 A1 | 5/2006 | Kamarajugadda et al. |
| 2006/0109588 A1 | 5/2006 | Le et al. |
| 2006/0174474 A1 | 8/2006 | Le |
| 2006/0198049 A1 | 9/2006 | Sasaki et al. |
| 2007/0035878 A1 | 2/2007 | Guthrie et al. |
| 2007/0035885 A1 | 2/2007 | Im et al. |
| 2007/0113395 A1 | 5/2007 | Dulay et al. |
| 2007/0137028 A1 | 6/2007 | Carey et al. |
| 2007/0177301 A1* | 8/2007 | Han et al. ................... 360/126 |

* cited by examiner

METHOD FOR PROVIDING A PERPENDICULAR MAGNETIC RECORDING (PMR) TRANSDUCER

BACKGROUND

FIG. 1 is a flow chart depicting a conventional method 10 for fabricating a conventional perpendicular magnetic recording (PMR) transducer. For simplicity, some steps are omitted. An intermediate layer, chemical mechanical planarization (CMP) stop layer and hard mask layer are provided, via step 12. The intermediate layer is typically aluminum oxide. The CMP stop layer may include Ru, while the hard mask layer may include NiCr. A photoresist mask is provided on the hard mask layer, via step 14. The photoresist mask includes an aperture above the portion of the intermediate layer in which the PMR pole is to be formed. A conventional aperture is formed in the hard mask layer 58 using a conventional ion milling process, via step 16. Step 16 also includes forming a conventional aperture in the CMP stop layer. Thus, through ion milling in step 16, the pattern of the photoresist mask is transferred to both the hard mask and the CMP stop layer in a conventional manner.

Using the hard mask and photoresist mask, a trench is formed in the aluminum oxide layer, via step 18. Step 18 is typically performed using an alumina reactive ion etch (RIE). The top of the trench 66 is desired to be wider than the trench bottom. In addition, the trench may extend through the aluminum oxide intermediate layer. As a result, the PMR pole formed therein will have its top surface wider than its bottom. Consequently, the sidewalls of the PMR pole will have a reverse angle. The conventional PMR pole materials are deposited, via step 20. A chemical mechanical planarization (CMP) is then performed, via step 22. The write gap is provided in step 24. Fabrication may then be completed in step 26. For example, a top shield may be provided.

Although the conventional method 10 may provide the conventional PMR transducer, there may be drawbacks. In particular, the conventional PMR pole may be subject to nonuniformities. The conventional apertures formed in the hard mask and CMP stop layers may not be symmetric. In addition, fencing from redeposition of the NiCr hard mask may exacerbate asymmetries in the hard mask. Consequently, the trench in the aluminum oxide layer and the sidewalls of the conventional PMR pole may not be symmetric. Thus, there may be variations in the critical dimensions of the PMR pole. Such variations may adversely affect the performance of the conventional PMR transducer. Thus, performance of the conventional PMR transducers 50 may be adversely affected.

Accordingly, what is needed is an improved method for fabricating a PMR transducer.

SUMMARY

A method and system for providing a PMR transducer including an intermediate layer are disclosed. The method and system include providing a hard mask layer on the intermediate layer. The hard mask layer is for a reactive ion etch of the intermediate layer. The method and system also include providing a bottom antireflective coating (BARC) layer on the hard mask layer. The BARC layer is also a masking layer for the hard mask layer. The method and system also include forming a trench in the intermediate layer using at least one reactive ion etch (RIE). The trench has a bottom and a top wider than the bottom. The method and system also include providing a PMR pole. At least a portion of the PMR pole resides in the trench.

DETAILED DESCRIPTION OF THE PREFERRED EMBODIMENTS

More recently in fabrication of PMR transducers, it has been determined that reactive ion etches may be used to form apertures in the hard mask layer. For example, the hard mask layer used might be Ta, NiNb, and/or NiCr. The hard mask layer is provided on the intermediate layer. On the hard mask layer, a planarization stop layer is provided. The planarization stop layer might include Ta or diamond-like carbon (DLC). Reactive ion etch(es) may be used to form apertures in the hard mask and planarization stop layer. The PMR pole may then be provided. For example, the magnetic layer(s) may be provided. Any excess might be removed using a planarization terminating at what remains of the planarization stop layer. The write gap and shield might then be provided.

Use of the reactive ion etch (RIE) to form an aperture in the hard mask layer may result in lower variations of the critical dimension of the PMR pole. The PMR pole may, therefore, be made with a lower track width. However, when using such a method, a thick layer of photoresist is typically used as mask. For example, photoresist layers on the order of 0.7-0.8 micron to one micron or more in thickness might be used. Use of a thick photoresist layer might result in variations in the overlay and, therefore, variations in the critical dimension of the PMR pole. Such variations are generally undesirable.

Figure 1:
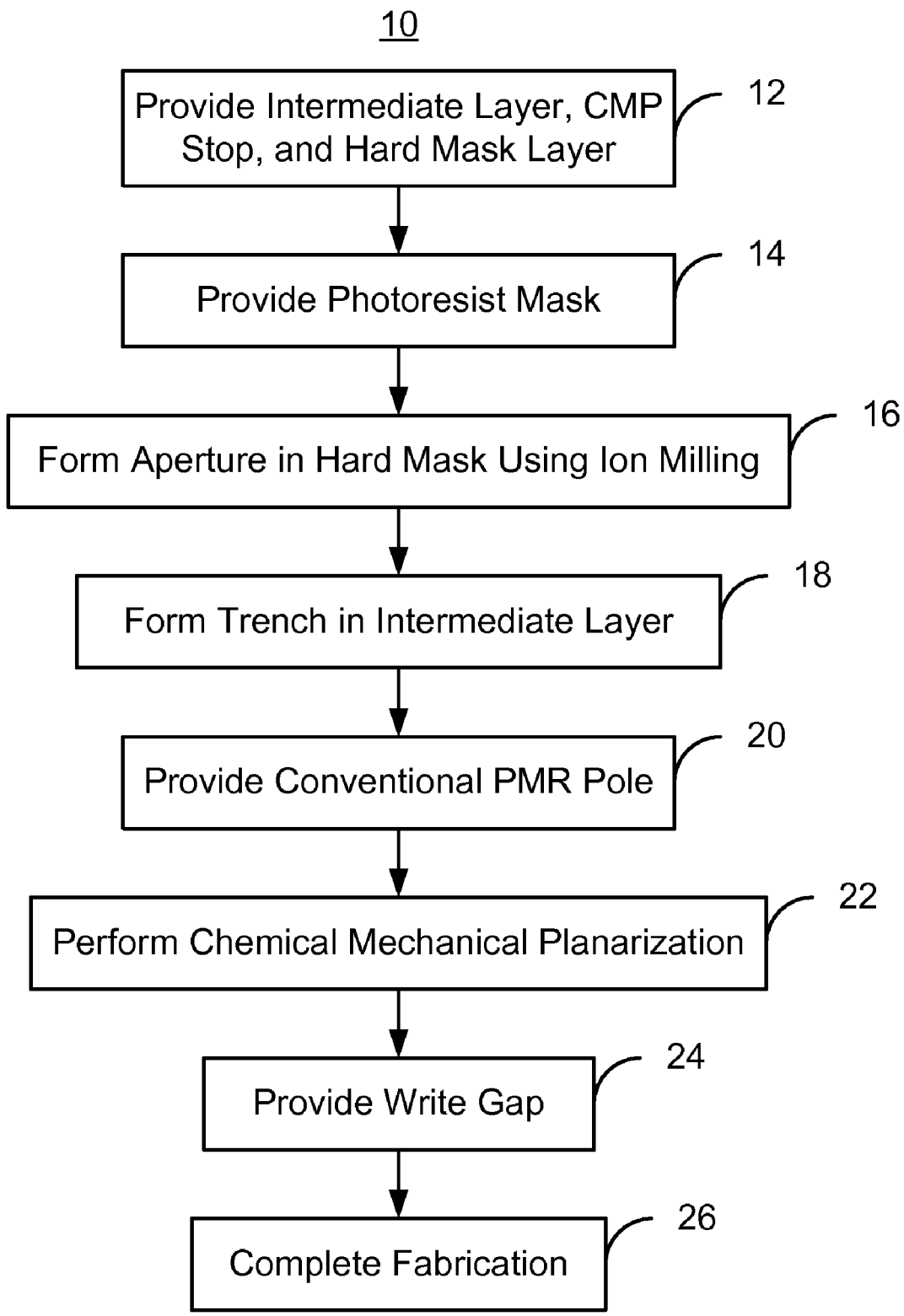
FIG. 1 is a flow chart depicting a conventional method for fabricating a PMR head.
Figure 2:
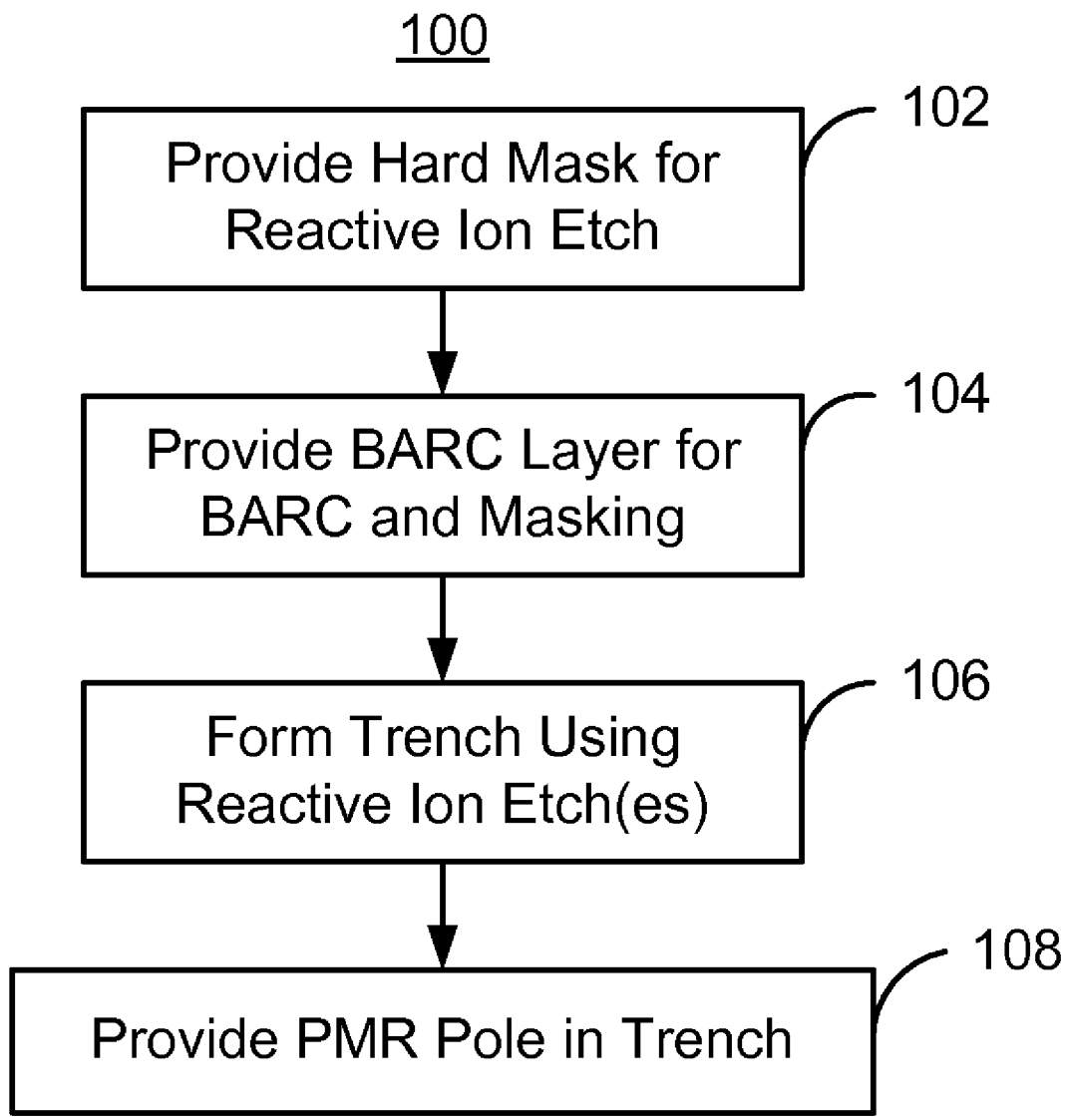
FIG. 2 is a flow chart depicting an exemplary embodiment of a method for fabricating a PMR transducer.

FIG. 2 is a flow chart depicting an exemplary embodiment of a method 100 for fabricating a PMR transducer. For simplicity, some steps may be omitted. The PMR transducer being fabricated may be part of a merged head that also includes a read head (not shown) and resides on a slider (not shown). The method 100 also may commence after formation of other portions of the PMR transducer. The method 100 is also described in the context of providing a single PMR transducer. However, the method 100 may be used to fabricate multiple transducers at substantially the same time. The method 100 and system are also described in the context of particular layers, such as a BARC layer. However, in some embodiments, such layers may include multiple sub-layers.

In one embodiment, the method 100 commences after formation of the intermediate layer(s) in which the PMR pole is to reside. In one embodiment, the intermediate layer is an insulator such as alumina. A hard mask layer is provided on the intermediate layer, via step 102. The hard mask layer is configured for a RIE of the intermediate layer. The hard mask layer is selected to have a high selectivity for an RIE of the intermediate layer. In one embodiment, the RIE selectivity is at least seven. Thus, the ratio of the removal rate of the intermediate layer to the removal rate of the hard mask in a RIE configured to remove the intermediate layer is at least seven. In another embodiment, the RIE selectivity is at least ten. In one embodiment, the hard mask layer includes at least one of Ru, Cr, and NiCr.

A BARC layer is provided on the hard mask layer, via step 104. The BARC layer is to reduce reflections for photolithography for a resist mask formed on the BARC layer. Furthermore, the BARC layer is used as a masking layer for the hard mask layer. The BARC layer may be considered to double as an etch mask for the hard mask layer. Consequently, the selectivity of the BARC is sufficiently high to allow removal of portions of the hard mask layer to form a hard mask. In one embodiment, the BARC layer has a RIE selectivity of at least six for the hard mask layer. Thus, the ratio of removal of the BARC layer to the removal rate of the hard mask layer in a RIE configured to remove the hard mask layer is at least six. In another embodiment, the RIE selectivity is at least eight. In one embodiment, such a BARC layer includes SiN.

A trench is formed in the intermediate layer using at least one RIE, via step 106. The trench formed has a bottom and a top wider than the bottom. In one embodiment, the trench extends through the intermediate layer. However, in another embodiment, the trench might extend only partially through the intermediate layer.

In one embodiment, step 106 includes using RIEs to form apertures in the BARC layer and the hard mask layer as well as forming a trench in the intermediate layer. For example, step 106 may include providing a mask on the BARC layer. The mask may be a photoresist (resist) mask. Such a resist mask would include an aperture above the region in which the trench is desired to be formed. The resist mask may have a thickness as low as 0.3 micron and less than 0.7 micron. In another embodiment, the resist mask thickness may be as low as 0.1 micron and less than 0.7 micron. In another embodiment, the resist mask thickness may be less than 0.1 micron. In one embodiment, an aperture is formed in the BARC using a first RIE, another aperture is formed in the hard mask layer using a second RIE, then the trench is provided in the intermediate layer. In order to ensure sufficient selectivity of the BARC and the hard mask layers, different etch chemistries may be used for the first and second RIEs. In addition, different etch chemistries may be used for the second and third RIEs. For example, in one embodiment, an etch chemistry for removing SiN may be used for the first etch that forms an aperture in the BARC layer. An etch chemistry including Cl, such as a $Cl_2$ and $O_2$ RIE, may be used for the second etch that forms the aperture in the hard mask layer. An etch chemistry that includes Cl may also be used for the intermediate layer RIE that forms a trench in the intermediate layer. In addition, in one embodiment, a RIE stop layer resides under the intermediate layer. Consequently, the RIE that actually removes material from the intermediate layer to form the trench does not substantially affect the underlying structures.

A PMR pole is provided, via step 108. At least a portion of the PMR pole resides in the trench. In one embodiment, only part of the PMR pole resides within the trench in the intermediate layer. Thus, the top of the PMR pole would be above the top of intermediate layer. In an alternate embodiment, the entire PMR pole resides within the trench. Formation of the PMR pole in step 108 may include providing a nonmagnetic layer in the trench. Such a nonmagnetic layer might be used to adjust the critical dimension, and thus the track width, of the PMR pole. Thus, the PMR pole would reside on such a nonmagnetic layer. In one embodiment, the nonmagnetic layer may be provided using atomic layer deposition (ALD). As part of step 108 planarization stop layer may also be provided. In one embodiment, the planarization stop layer is provided on the nonmagnetic layer. The planarization stop layer may be a CMP stop layer. In one such embodiment, the planarization stop layer includes Ru. A seed layer for the PMR pole may also be provided on the planarization stop layer. In another embodiment, the planarization stop layer may also function as a seed layer. The layer(s) for the PMR pole may then be blanket deposited. A planarization, such as a CMP, may be performed. Thus, the PMR pole may be formed. Although described above as part of formation of the PMR pole, at least some of the steps of providing the nonmagnetic layer, the planarization stop layer and/or the seed layer may be considered separate from providing the PMR pole.

Using the method 100, at least part of a PMR transducer may be formed. The method 100 utilizes a BARC layer that is also a mask for the hard mask layer. In one embodiment, the selectivity for the BARC layer and for the hard mask layer is also sufficiently high to form the hard mask from the hard mask layer. As a result, a resist mask used in patterning for the PMR pole may be thin. For example, as discussed above, thicknesses as low as 0.1-0.3 microns might be used. Because a thin resist mask may be used, variations in the overlay may be reduced. Consequently, variations of the critical dimensions of the PMR pole may also be diminished. In addition, because the selectivity between the BARC layer and the hard mask layer may be high, the critical dimension bias (CD bias) may be reduced. The CD bias is difference between the width of the aperture as formed in the BARC layer and the width of the aperture formed in the hard mask. A reduction in the CD bias also reduces the variation in the critical dimension. The critical dimension, and thus track width, of the PMR pole may also be reduced. The PMR transducer may thus be used at higher densities.

Figure 3:
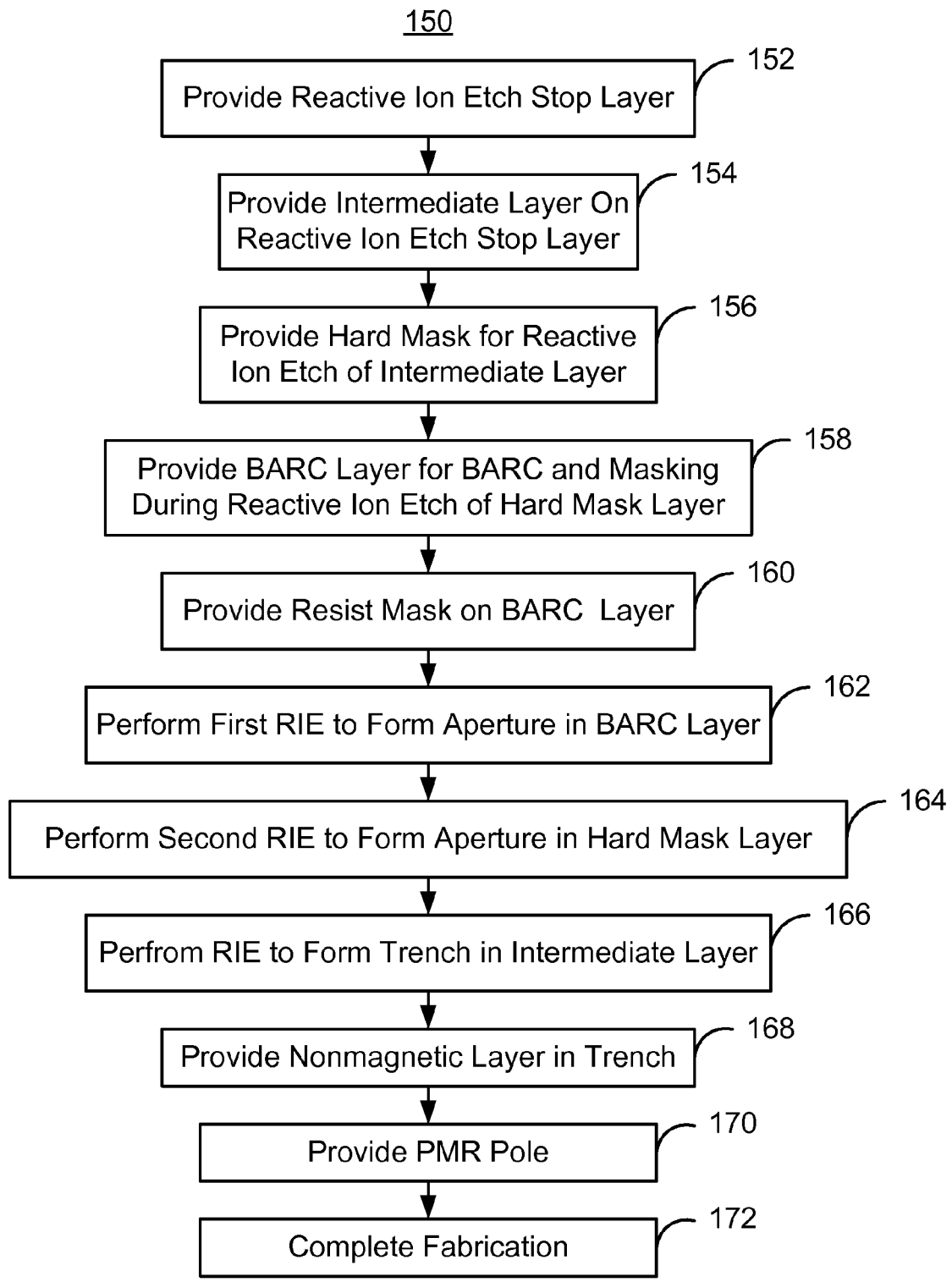
FIG. 3 is a flow chart depicting another embodiment of a method for fabricating a PMR transducer.

FIG. 3 is a flow chart depicting another exemplary embodiment of a method 150 for fabricating a PMR transducer. For simplicity, some steps may be omitted. FIGS. 4-13 are diagrams depicting an exemplary embodiment of a PMR transducer 200 as viewed from the ABS during fabrication. For clarity, FIGS. 4-13 are not to scale. Referring to FIGS. 3-13, the method 150 is described in the context of the PMR transducer 200. However, the method 150 may be used to form another device (not shown). The PMR transducer 200 being fabricated may be part of a merged head that also includes a read head (not shown) and resides on a slider (not shown). The method 150 also may commence after formation of other portions of the PMR transducer 200. The method 150 is also described in the context of providing a single PMR transducer. However, the method 150 may be used to fabricate multiple transducers at substantially the same time. The method 150 and device 200 are also described in the context of particular layers, such as a bottom antireflective coating (BARC) layer. However, in some embodiments, such layers may include multiple sublayers.

A RIE stop layer is provided, via step 152. An intermediate layer is provided on the RIE stop layer, via step 154. The intermediate layer may be an insulator, such as alumina. The RIE stop layer provided in step 152 is insensitive to an RIE configured to etch the intermediate layer. For example, the RIE stop layer may be insensitive to a RIE performed with a gas containing Cl and which is configured to etch alumina.

A hard mask layer is provided on the intermediate layer, via step 156. The hard mask layer is configured to provide a mask for a RIE of the intermediate layer. The hard mask layer is selected to have a high selectivity for an RIE of the intermediate layer. In one embodiment, the RIE selectivity is at least seven. In another embodiment, the RIE selectivity is at least ten. In one embodiment, the hard mask layer includes at least one of Ru, Cr, and NiCr. The thickness of such a hard mask layer may be at least two hundred Angstroms.

Figure 4:
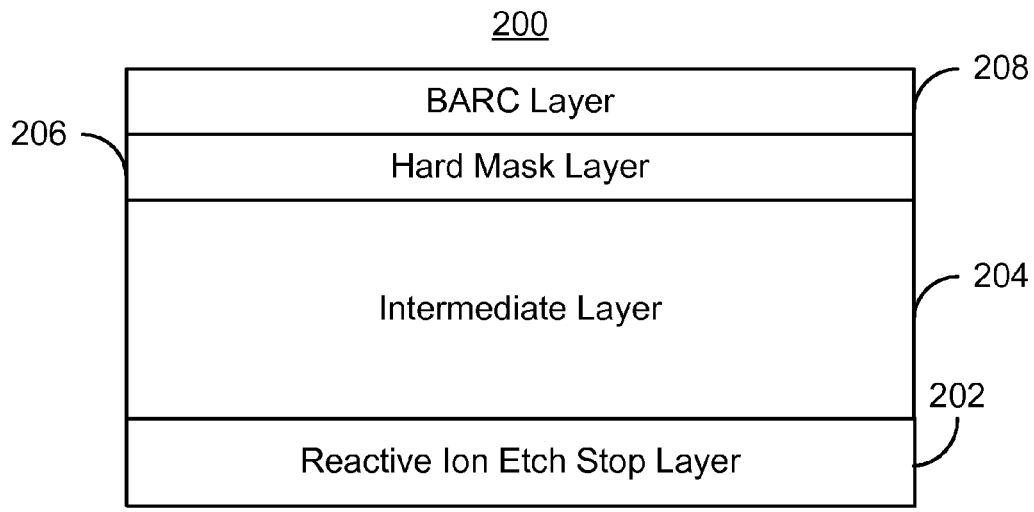
FIGS. 4-13 are diagrams depicting an exemplary embodiment of a perpendicular magnetic recording transducer during fabrication.

A BARC layer is provided on the hard mask layer, via step 158. As its name suggests, the BARC layer acts as an antireflective coating for photolithography, described below. Furthermore, the BARC layer doubles as an etch mask for the hard mask layer. Consequently, the selectivity of the BARC is sufficiently high to allow removal of portions of the hard mask layer to form a hard mask. In one embodiment, the BARC layer has a RIE selectivity of at least six for the hard mask layer. In another embodiment, the RIE selectivity is at least eight. In one embodiment, such a BARC layer includes SiN. The thickness of such a BARC layer may be at least one hundred Angstroms. In one embodiment, the BARC layer has a thickness of at least two hundred and not more than one thousand Angstroms. FIG. 4 depicts a portion of the PMR transducer 200 after step 158 is performed. As a result, an etch stop layer 202 residing under an intermediate layer 204 are shown. The PMR transducer 200 also includes a hard mask layer 206 and a BARC layer 208.

Figure 5:
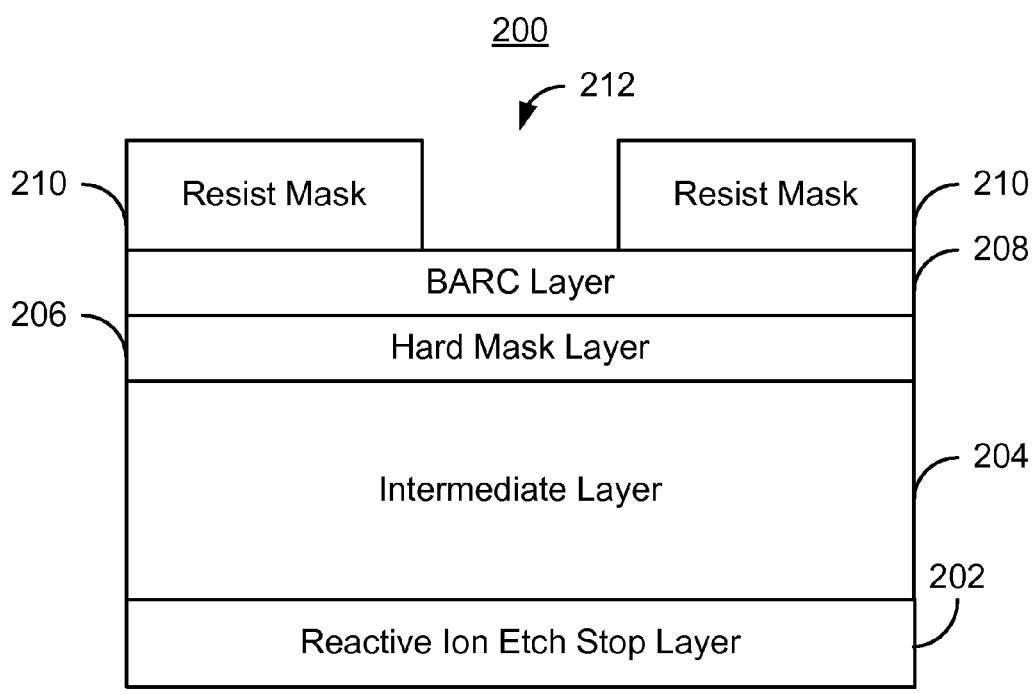

A resist mask is provided on the BARC layer 208, via step 160. In one embodiment, step 160 includes providing a layer of photoresist on the PMR transducer 200 and exposing selected portions of the photoresist layer to electromagnetic radiation. The BARC layer 208 is configured to reduce reflections of the electromagnetic radiation used in exposing the photoresist layer. FIG. 5 depicts the PMR transducer 200 after step 160 is performed. Consequently, the resist mask 210 is shown on the BARC layer 208. The resist mask 210 includes aperture 212 therein. The aperture 212 resides on the region of the intermediate layer 204 in which the trench for the PMR pole will be formed. The resist mask has a thickness of not more than 0.3 micron.

Figure 6:
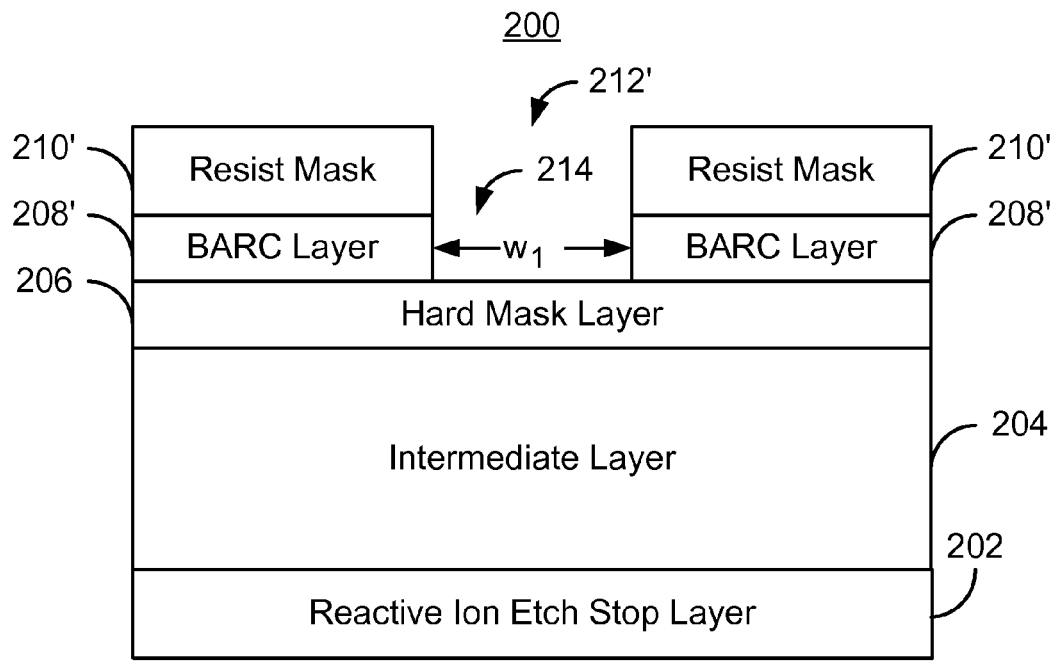

A first RIE having a first chemistry is performed, via step 162. The first RIE is configured to remove a portion of the BARC layer 208 to form an aperture substantially aligned with the aperture 212 in the resist mask 210. In one embodiment, the first RIE is configured to remove SiN. FIG. 6 depicts the PMR transducer 200 after step 162 is performed. Consequently, an aperture 214 has been formed in the BARC layer 208'. A portion of the resist mask may have been removed in step 162. Consequently, resist mask 210' including aperture 212' remains. The aperture 214 in the BARC layer 208' has a critical dimension $w_1$.

Figure 7:
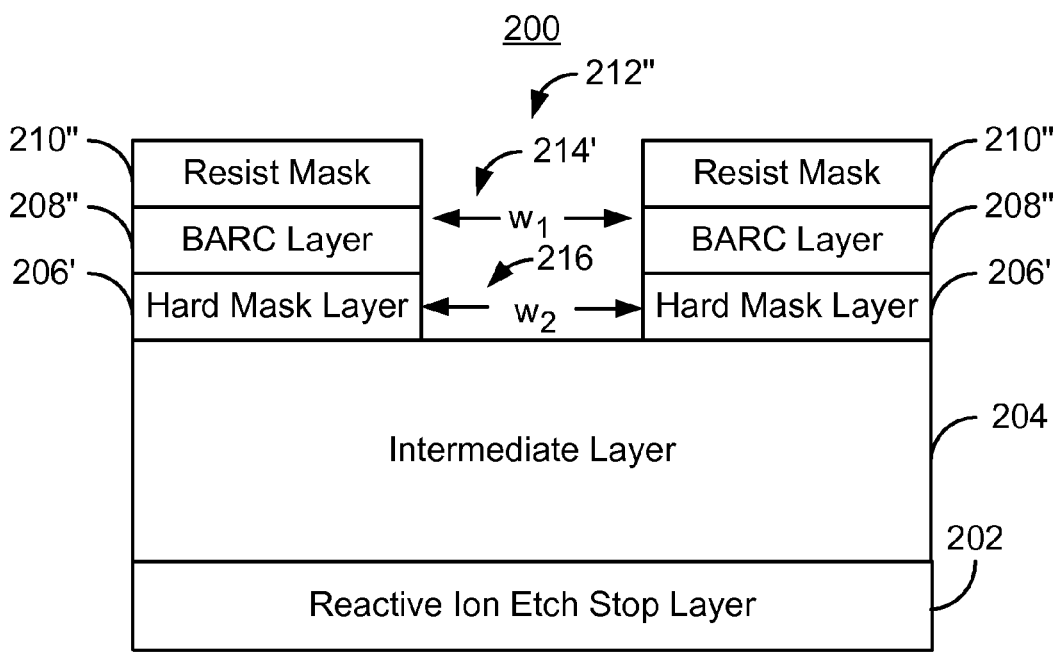

A second RIE having a second chemistry is performed, via step 164. The second RIE is configured to remove a portion of the hard mask layer 206. In one embodiment, the second RIE is configured to remove at least one of Ru, Cr, and NiCr. The chemistry of the second RIE may thus differ from the etch chemistry of the first RIE. In particular, an etch chemistry including $Cl_2$ and $O_2$ may be used for step 164. FIG. 7 depicts the PMR transducer 200 after step 164 is performed. Consequently, an aperture 216 has been formed in the hard mask layer 206'. The aperture 216 in the hard mask layer 206' has a critical dimension $w_2$. Portions of the resist mask 210' and BARC layer 208' may be removed in step 164. Consequently, the resist mask 210" having aperture 212" is shown. Similarly, a remaining portion of the BARC layer 208" having aperture 214' therein is shown. The apertures 216, 214', and 212" are substantially aligned. In addition, because of the selectivity of the BARC layer, the critical dimension $w_2$ of the aperture 216 may not be significantly different from the critical dimension $w_1$ of the aperture 214. Thus, the CD bias of the hard mask layer 206' may be reduced.

Figure 8:
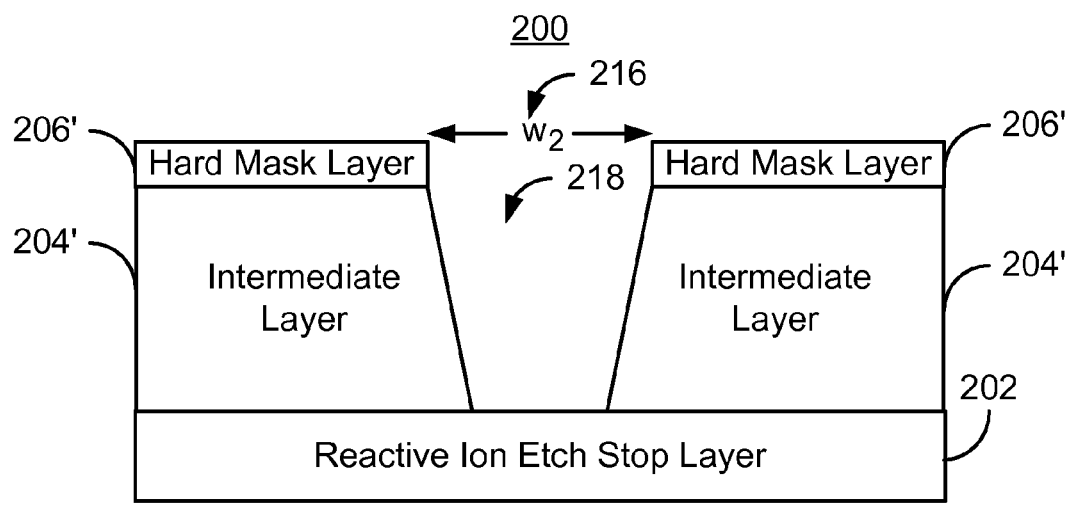

An RIE is performed for the intermediate layer 204, via step 166. Thus, a trench is formed in the intermediate layer 204. In one embodiment, step 166 includes utilizing an etch chemistry that differs from the etch chemistry used for the first and/or second RIEs of steps 162 and 164, respectively. For example, in one embodiment, gas(es) containing Clare used in step 166. FIG. 8 depicts the PMR transducer after step 166 is performed. Consequently, a trench 218 has been formed in the intermediate layer 204'. In the embodiment shown, the remaining resist mask 210" and BARC layer 208' have been consumed. In another embodiment, one or more of the layers 210" and 208' may be otherwise removed. Because of the selectivity of the hard mask layer 206', the critical dimension $w_2$ of the aperture 216 may not change significantly. Consequently, in FIG. 8, the critical dimension is shown has being the same. However, in another embodiment, there may be some change in the critical dimension $w_2$ of the aperture 216. Thus, the CD bias of the hard mask layer 206' may be reduced. Further, because the RIE stop layer 202 is provided, the bottom of the trench 218 is substantially flat. Stated differently, the RIE performed in step 166 may remove little or none of the RIE stop layer 202. In one embodiment, the trench 218 extends through the intermediate layer 204'. However, in another embodiment, the trench 218 might extend only partially through the intermediate layer 214'

Figure 9:
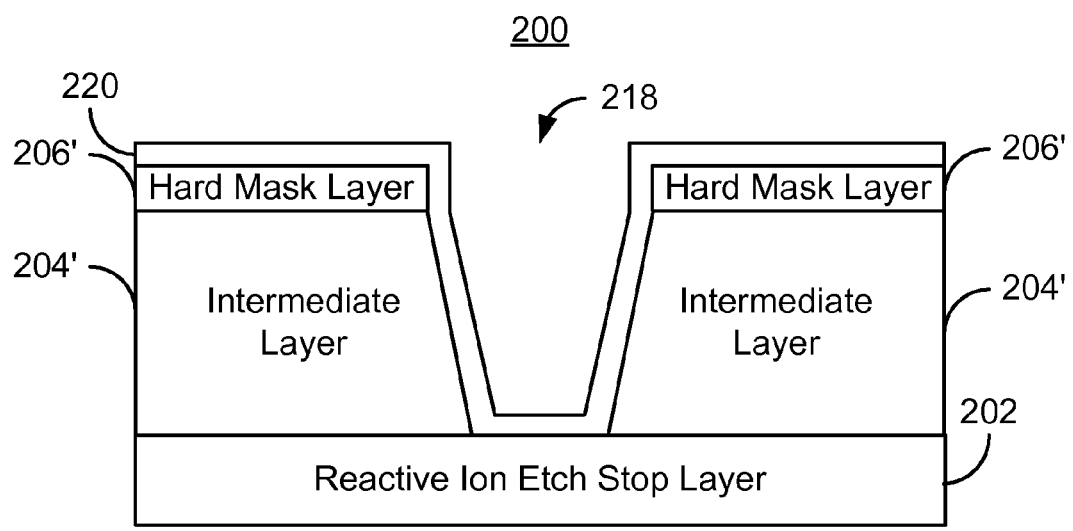

A nonmagnetic layer is provided in the trench 218, via step 168. In one embodiment, step 168 may be performed using ALD. However, in another embodiment, another method for providing the nonmagnetic layer may be used. Alternatively, step 168 might be omitted. FIG. 9 depicts the PMR transducer 200 after step 168 is performed. Thus, a nonmagnetic layer 220 is shown. A portion of the nonmagnetic layer 220 resides within the trench 218 in the intermediate layer. However, a portion of the nonmagnetic layer 220 also resides on and next to the hard mask layer 206'. Thus, a portion of the nonmagnetic layer 220 is above the top of the intermediate layer 204'.

Thus, the thickness of the nonmagnetic layer 220 may be used to tune the width of the PMR pole being formed. In particular, the width the PMR pole being formed may be reduced by twice the thickness of the nonmagnetic layer 220. For example, in one embodiment, the nonmagnetic layer 220 may be at least fifty and not more than four hundred Angstroms. Consequently, use of a nonmagnetic layer 220 allows the width of the PMR pole being formed to be reduced by one hundred to eight hundred Angstroms.

A PMR pole is provided, via step 170. Step 170 may include multiple sub-steps. For example, in one embodiment, a planarization stop layer may be provided on the nonmagnetic layer 220. Such a planarization stop layer might include, for example, Ru. In one embodiment, a seed layer may also be provided. Such a seed layer may be nonmagnetic or magnetic. If magnetic, the seed layer may be magnetically indistinct from the PMR pole. Thus, the seed layer may be considered part of the PMR pole. In another embodiment, the seed layer may be nonmagnetic. In such an embodiment, the seed layer would be magnetically distinct from the PMR pole.

Figure 10:
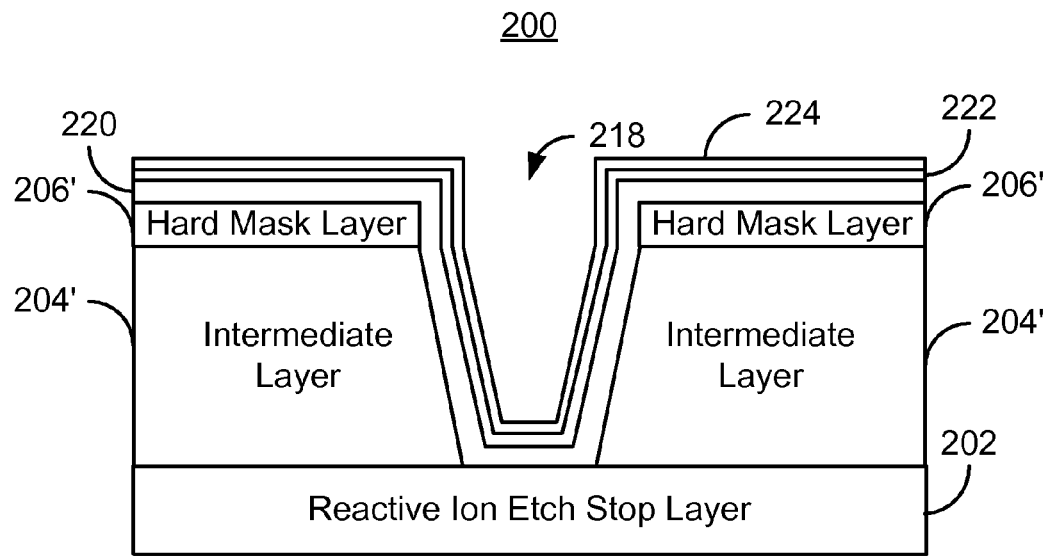

In one embodiment, the seed layer and the planarization stop layer may function as a single layer or be merged into a single layer. FIG. 10 depicts the PMR transducer 200 after such sub-steps are performed. Consequently, a planarization stop layer 222 and seed layer 224 are shown. A portion of each of the planarization stop layer 222 and a portion of the seed layer 224 reside within the trench 218. However, a portion of the layers 222 and 224 are next to and on the nonmagnetic layer 220. Consequently, a portion of each of the layers 222 and 224 is above the top of the intermediate layer 204'.

Figure 11:
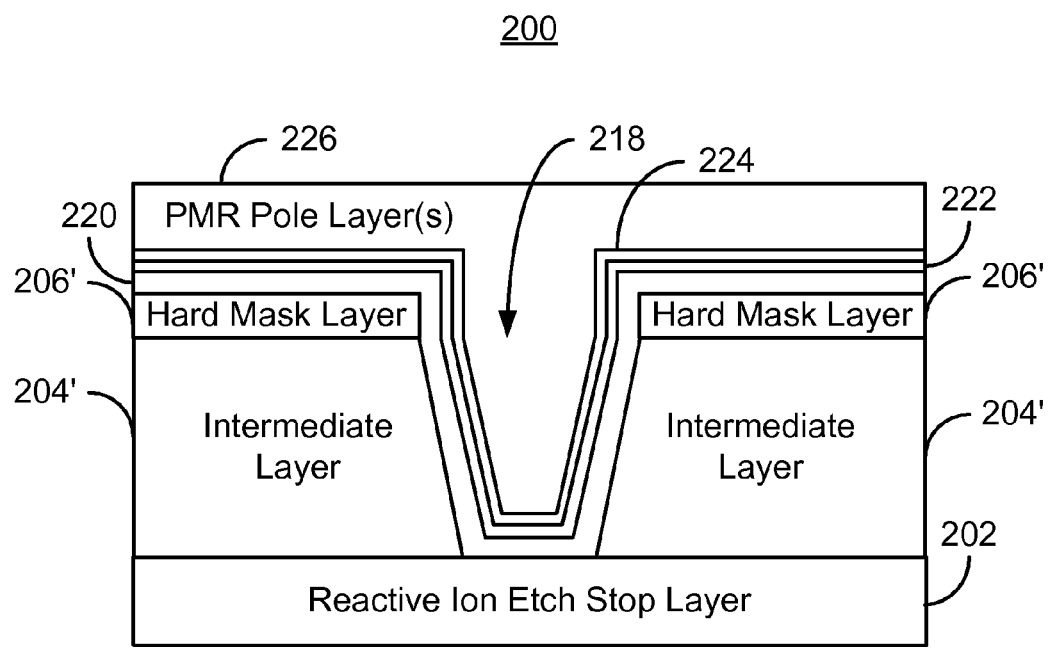
Figure 12:
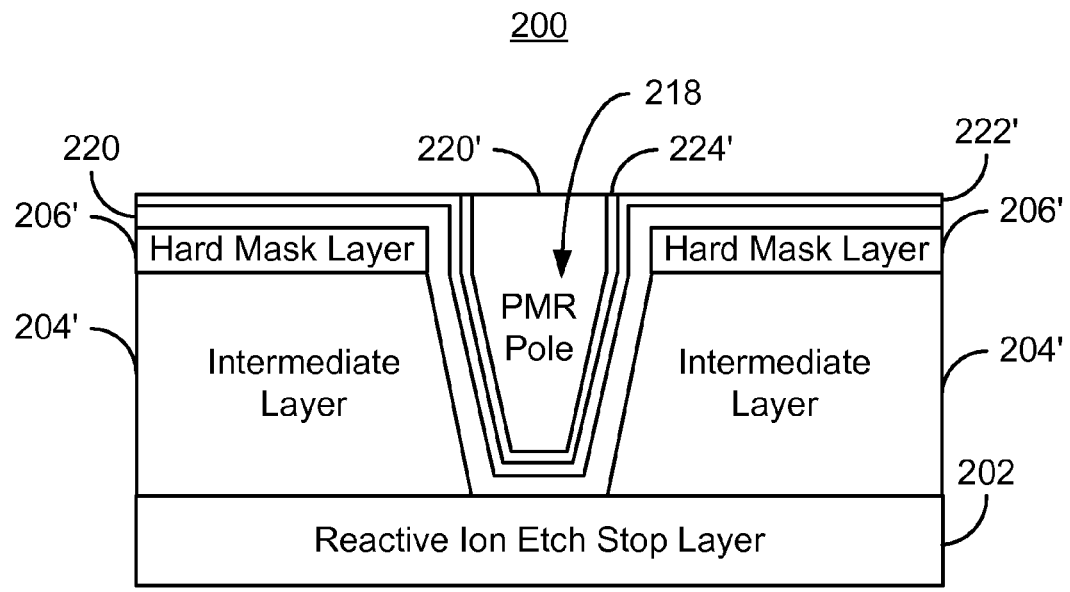

Also in step 170, the layer(s) for the PMR pole are provided. In one embodiment, the layers may be plated. In an embodiment, a single layer is typically used. However, in another embodiment, multiple layers might be used for the PMR pole. Consequently, multiple layers might be deposited in step 170. FIG. 11 depicts the PMR transducer 200 after this sub-step is performed. Consequently, the PMR pole layer(s) 226 are shown. In the embodiment shown, the PMR pole layer(s) are blanket deposited. However, in another embodiment, masking might be used. A planarization is also performed in step 170. In one embodiment, the planarization may be a CMP. Such a planarization terminates when at least a portion of the planarization stop layer 222' remains. FIG. 12 depicts the PMR transducer after such a sub-step has been performed and step 170 is completed. Consequently, the PMR pole 220' has been formed from the PMR pole layer(s) 220. In addition, a portion of the seed layer has been removed. Consequently, only the seed layer 224' remains. In the embodiment shown, only a portion of the PMR pole 220' resides within the trench 218. This portion of the PMR pole 220' has a top wider than the bottom. Stated differently, there is a negative angle (as measured from vertical) for these portions of the sidewalls of the PMR pole 220'. A remaining portion of the PMR pole 220' is next to the hard mask layer 206', nonmagnetic layer 220, and remaining planarization stop layer 222'. This portion of the sidewalls for the PMR pole 220' is substantially vertical.

Figure 13:
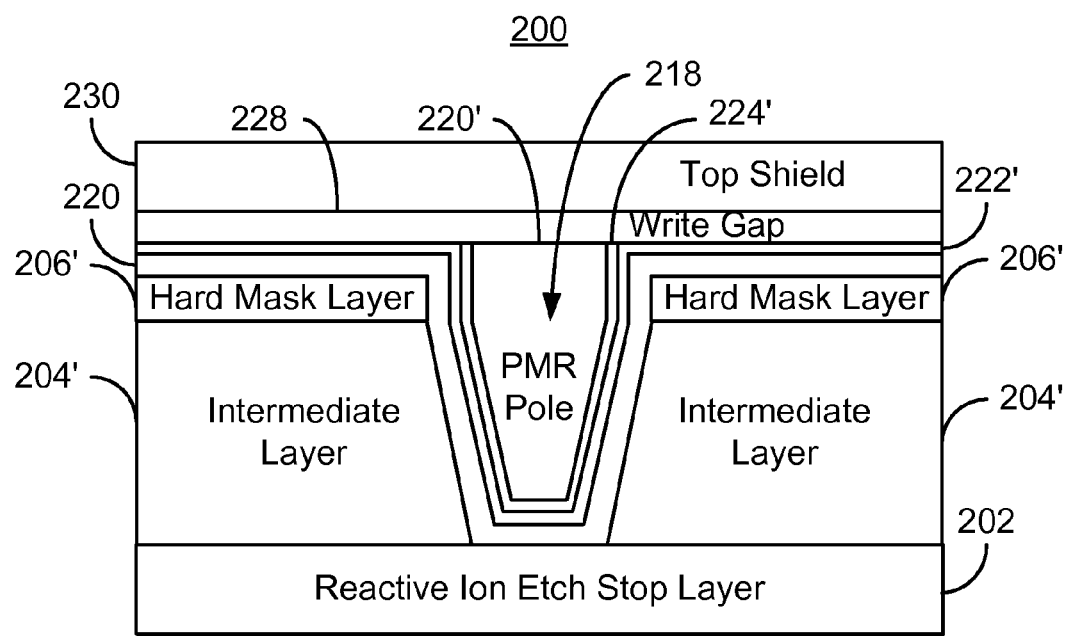

Fabrication of the PMR transducer 200 might then be completed, via step 172. For example, a write gap, a shield, and other structures might be provided in step 172. FIG. 13 depicts the PMR transducer 200 after step 172 is completed. Thus, the write gap 228 and top shield 230 are shown. In one embodiment, the write gap 228 may be an insulator, such as aluminum oxide. In another embodiment, other material(s) may be used.

Using the method 150, at least part of a PMR transducer may be formed. Because of the use of the BARC layer 206' that also serves as a mask for the hard mask layer 208' and the selectivity of the BARC layer 206', the resist mask 210 used in patterning may be thin. For example, as discussed above, thicknesses as low as 0.1-0.3 microns might be used. Because a thin resist mask may be used, variations in the overlay may be reduced. Consequently, variations of the critical dimensions of the PMR pole may also be diminished. In addition, because the selectivity between the BARC layer and the hard mask layer may be high, the CD bias may also be reduced. A reduction in the CD bias also reduces the variation in the critical dimension. The critical dimension, and thus track width, of the PMR pole may also be reduced. This reduction may be further enhanced by the use of the nonmagnetic layer 220 and layers 222' and 224'. The PMR transducer may thus be used at higher densities.

We claim:

1. A method for providing a perpendicular magnetic recording (PMR) transducer including an intermediate layer, the method comprising:
   providing a hard mask layer on the intermediate layer, the hard mask layer for a reactive ion etch of the intermediate layer, the intermediate layer being a nonmagnetic insulating layer;
   providing a bottom antireflective coating (BARC) layer on the hard mask layer, the BARC layer further being a masking layer for the hard mask layer;
   forming a trench in the intermediate layer using at least one reactive ion etch (RIE), the trench having a bottom and a top wider than the bottom; and
   providing a PMR pole, at least a portion of the PMR pole residing in the trench.

2. The method of claim 1 wherein the BARC layer has a RIE selectivity of at least six for the hard mask layer.

3. The method of claim 2 wherein the RIE selectivity is at least eight.

4. The method of claim 1 wherein the hard mask layer has a RIE selectivity of at least seven for the intermediate layer.

5. The method of claim 4 wherein the RIE selectivity is at least ten.

6. The method of claim 1 wherein the BARC layer includes SiN.

7. The method of claim 1 wherein the hard mask layer includes at least one of Ru, Cr, and NiCr.

8. The method of claim 1 further comprising:
   providing a nonmagnetic layer in the trench, at least a portion of the nonmagnetic layer residing in the trench, the PMR pole residing on the nonmagnetic layer.

9. The method of claim 1 further comprising:
   providing a RIE stop layer under the intermediate layer, the RIE stop layer corresponding to at least a portion of the at least one RIE forming the trench in the intermediate layer.

10. The method of claim 1 wherein the BARC layer is the masking layer for a RIE of the hard mask layer.

11. A method for providing a perpendicular magnetic recording (PMR) transducer including an intermediate layer, the method comprising:
   providing a hard mask layer on the intermediate layer, the hard mask layer for a reactive ion etch of the intermediate layer;
   providing a bottom antireflective coating (BARC) layer on the hard mask layer, the BARC layer further being a masking layer for the hard mask layer;
   forming a trench in the intermediate layer using at least one reactive ion etch (RIE), the trench having a bottom and a top wider than the bottom; and
   providing a PMR pole, at least a portion of the PMR pole residing in the trench, wherein the step of forming the trench further includes:
   providing a resist mask on the BARC layer, the resist mask having an aperture therein;
   performing a first RIE having a first chemistry on the BARC layer to form a first aperture substantially aligned with the aperture in the resist mask; and
   performing a second RIE having a second chemistry on the hard mask layer to form a second aperture substantially aligned with the first aperture.

12. The method of claim 11 wherein the first chemistry is different from the second chemistry.

13. The method of claim 12 wherein the second chemistry includes Cl.

14. The method of claim 11 wherein the resist mask has a thickness of not more than 0.3 microns.

15. The method of claim 14 wherein the resist mask has a thickness of not less than 0.1 microns.

16. A method for providing a perpendicular magnetic recording (PMR) transducer including an intermediate layer, the method comprising:
   providing a hard mask layer on the intermediate layer, the hard mask layer for a reactive ion etch of the intermediate layer;
   providing a bottom antireflective coating (BARC) layer on the hard mask layer, the BARC layer further being a masking layer for the hard mask layer;
   forming a trench in the intermediate layer using at least one reactive ion etch (RIE), the trench having a bottom and a top wider than the bottom; and
   providing a PMR pole, at least a portion of the PMR pole residing in the trench, wherein the providing the PMR pole further includes:

providing a planarization stop layer;

plating a PMR pole layer on the planarization stop layer; and performing a planarization.

17. A method for providing a perpendicular magnetic recording (PMR) transducer comprising:

providing a reactive ion etch (RIE) stop layer;

providing an intermediate layer on the RIE stop layer, the RIE stop layer being insensitive to an intermediate layer RIE configured to etch the intermediate layer;

providing a hard mask layer on the intermediate layer, the hard mask layer for a RIE of the intermediate layer, the hard mask layer having a selectivity of at least seven for the intermediate layer;

providing a bottom antireflective coating (BARC) layer on the hard mask layer, the BARC layer further being a masking layer for the hard mask layer, the BARC layer having a selectivity of at least six for the hard mask layer;

providing a resist mask on the BARC layer, the resist mask having an aperture therein and a thickness of not more than 0.3 micron;

performing a first RIE having a first chemistry on the BARC layer to form a first aperture substantially aligned with the aperture in the resist mask;

performing a second RIE having a second chemistry on the hard mask layer to form a second aperture substantially aligned with the first aperture, the second chemistry being different from the first chemistry;

performing the intermediate layer RIE to form a trench in the intermediate layer, the trench having a bottom and a top wider than the bottom;

providing a nonmagnetic layer in the trench, at least a portion of the nonmagnetic layer residing in the trench; and providing a PMR pole, at least a portion of the PMR pole residing in the trench, the PMR pole residing on the nonmagnetic layer.

* * * * *